US011102615B2

(12) United States Patent
Cheney et al.

(10) Patent No.: US 11,102,615 B2
(45) Date of Patent: Aug. 24, 2021

(54) UNIFIED DEVICE ACCESS

(71) Applicant: Procon Analytics, LLC, Irvine, CA (US)

(72) Inventors: William Cheney, La Jolla, CA (US); David Meyer, Knoxville, TN (US)

(73) Assignee: Procon Analytics, LLC, Irvine, CA (US)

( * ) Notice: Subject to any disclaimer, the term of this patent is extended or adjusted under 35 U.S.C. 154(b) by 0 days.

(21) Appl. No.: 16/490,086

(22) PCT Filed: Mar. 27, 2019

(86) PCT No.: PCT/US2019/024274
§ 371 (c)(1),
(2) Date: Aug. 30, 2019

(87) PCT Pub. No.: WO2019/191226
PCT Pub. Date: Oct. 3, 2019

(65) Prior Publication Data
US 2021/0006941 A1 Jan. 7, 2021

Related U.S. Application Data

(60) Provisional application No. 62/649,286, filed on Mar. 28, 2018.

(51) Int. Cl.
*H04W 4/029* (2018.01)
*H04W 4/40* (2018.01)
(Continued)

(52) U.S. Cl.
CPC ........... *H04W 4/029* (2018.02); *G01S 5/0027* (2013.01); *H04W 4/40* (2018.02); *H04W 92/18* (2013.01)

(58) Field of Classification Search
CPC ....... H04W 4/029; H04W 4/40; H04W 92/18; G01S 5/0027
See application file for complete search history.

(56) References Cited

U.S. PATENT DOCUMENTS

2008/0216097 A1* 9/2008 Quinn ................... G06F 3/0605
719/328
2009/0150768 A1* 6/2009 Bae ...................... G08G 1/0969
715/248
(Continued)

OTHER PUBLICATIONS

International Search Report and Written Opinion for PCT/US2019/024274, dated Jun. 21, 2019, 12 pages.

*Primary Examiner* — Minjung Kim
(74) *Attorney, Agent, or Firm* — Luedeka Neely Group, P.C.

(57) ABSTRACT

A master system for providing a single interface between a user and service providers associated with the user's telematic devices. A storage module stores information, including serial numbers of the telematic devices, car information associated with the telematic devices, buyer information associated with the telematic devices, and location information associated with the telematic devices. An interface receives queries from the user and provides selected subsets of the information as responses to the user. An input-output holds multiple simultaneous communication sessions with service providers. A processor receives the queries from the user through the interface, analyzes the information on the storage module to identify a selection of the service providers to which the queries pertain, requests data from the selection of the service providers through the input-output, receives feedback from the selection of the service providers through the input-output, associates the feedback with relevant portions of the information, and presents at least portions of the feedback with the relevant portions of the (Continued)

information to the user through the interface as the response to the user's query.

14 Claims, 5 Drawing Sheets

(51) Int. Cl.
    *G01S 5/00*     (2006.01)
    *H04W 92/18*     (2009.01)

(56) References Cited

U.S. PATENT DOCUMENTS

| | | |
|---|---|---|
| 2009/0197593 A1 | 8/2009 | Farrell et al. |
| 2012/0226390 A1* | 9/2012 | Adams .................... G07C 5/008 |
| | | 701/1 |
| 2013/0196612 A1 | 8/2013 | Cepuran et al. |
| 2014/0358896 A1 | 12/2014 | Camacho et al. |
| 2015/0210287 A1 | 7/2015 | Penilla et al. |
| 2015/0288636 A1 | 10/2015 | Yalavarty et al. |
| 2016/0274882 A1* | 9/2016 | Fazi .......................... G06F 8/61 |
| 2019/0392367 A1* | 12/2019 | Gara ....................... H04W 4/02 |

\* cited by examiner

UNIFIED DEVICE ACCESS

This application claims priority and rights on prior U.S. provisional patent application Ser. No. 62/649,286 filed 2018 Mar. 28, the entirety of which is included herein by reference. This invention relates to the field of asset tracking. More particularly, this invention relates to a common platform for communicating with different GPS tracking master systems.

FIELD

Introduction

Automotive telematics is the name given to a hardware package that includes a radio transmitter, a GPS receiver, sensors, and a power management system. This package is inserted into an asset, such as a car, for the purpose of tracking the location and other information about the asset. Automotive telematics communicate with a national wireless network and cloud services, regardless of their location—so long as radio contact with the network can be established. The information provided by the telematics can be accessed by authorized users.

Telematics have become a standard tool that is used by companies that lend money to car buyers. The telematics are installed in the purchased vehicle so that the lender can track the location of and other information about the vehicle. Lenders use telematics to locate the vehicle, assess risks, verify the loan stipulations, create a notification if the vehicle crosses state lines or goes outside the country, send borrowers payment reminders, assist in the recovery process when defaults take place, and so forth. Other users could include car dealers, car rental agencies, and law enforcement, for example.

As telematics have improved over time, new providers have entered the market, using different hardware and different control systems. Thus, each telematics service provider tends to have their own proprietary system for accessing their telematics hardware. This has made it more challenging for users to manage their device portfolio, as it has been broken up across multiple platforms.

What is needed, therefore, is a system that tends to reduce issues such as those described above, at least in part.

SUMMARY

The above and other needs are met by a master system for providing a single interface between a user and service providers associated with the user's telematic devices. A storage module stores information, including serial numbers of the telematic devices, car information associated with the telematic devices, buyer information associated with the telematic devices, and location information associated with the telematic devices. An interface receives queries from the user and provides selected subsets of the information as responses to the user. An input-output holds multiple simultaneous communication sessions with service providers. A processor receives the queries from the user through the interface, analyzes the information on the storage module to identify a selection of the service providers to which the queries pertain, requests data from the selection of the service providers through the input-output, receives feedback from the selection of the service providers through the input-output, associates the feedback with relevant portions of the information, and presents at least portions of the feedback with the relevant portions of the information to the user through the interface as the response to the user's query.

In various embodiments according to this aspect of the present invention, the master system receives queries from the user in a high-level language, produces commands in a low-level language based on the queries, and sends the commands to the service providers. In some embodiments, the master system receives feedback from the service providers in a low-level language, produces responses in a high-level language, and sends the responses to the user. In some embodiments, the master system receives feedback from the service providers in a low-level language, produces responses as new web pages, and sends the new web pages to the user.

In some embodiments, the master system provides the response to the user as a map that depicts an associated location for each telematic device associated with a given one of the queries. In some embodiments, the master system provides the response to the user as an interactive map that depicts indictors on associated locations for each telematic device associated with a given one of the queries, and when the user selects one of the indicators, the master system displays additional information associated with the telematic device.

According to another aspect of the invention there is described a method for providing a single interface between a user and service providers associated with the user's telematic devices. Information is stored in a storage module, where the information includes serial numbers of the telematic devices, car information associated with the telematic devices, buyer information associated with the telematic devices, and location information associated with the telematic devices. Queries are received from the user and selected subsets of the information are presented as responses to the user through an interface. Multiple simultaneous communication sessions are held with service providers through an input-output. The queries are received from the user through the interface, and the information on the storage module is analyzed to identify a selection of the service providers to which the queries pertain. Data from the selection of the service providers is requested through the input-output, and feedback from the selection of the service providers is received through the input-output. The feedback is associated with relevant portions of the information, and at least portions of the feedback are presented with the relevant portions of the information to the user through the interface as the response to the user's query.

In various embodiments according to this aspect of the present invention, the queries are received from the user in a high-level language, are converted to a low-level language, and sent to the service providers in the low-level language. In some embodiments, the feedback is received from the service providers in a low-level language, converted to a high-level language, and the response is sent to the user in the high-level language. In some embodiments, the feedback from the service providers is received in a low-level language, converted to a new web page, and the new web page is sent to the user.

In some embodiments, the response to the user is formatted as a map that depicts an associated location for each telematic device associated with a given one of the queries. In some embodiments, the response to the user is formatted as an interactive map that depicts indictors on associated locations for each telematic device associated with a given one of the queries, and when the user selects one of the indicators, additional information associated with the telematic device is displayed on the map.

DRAWINGS

Further advantages of the invention are apparent by reference to the detailed description when considered in conjunction with the figures, which are not to scale so as to more clearly show the details, wherein like reference numbers indicate like elements throughout the several views, and wherein.

DESCRIPTION

Figure 1:
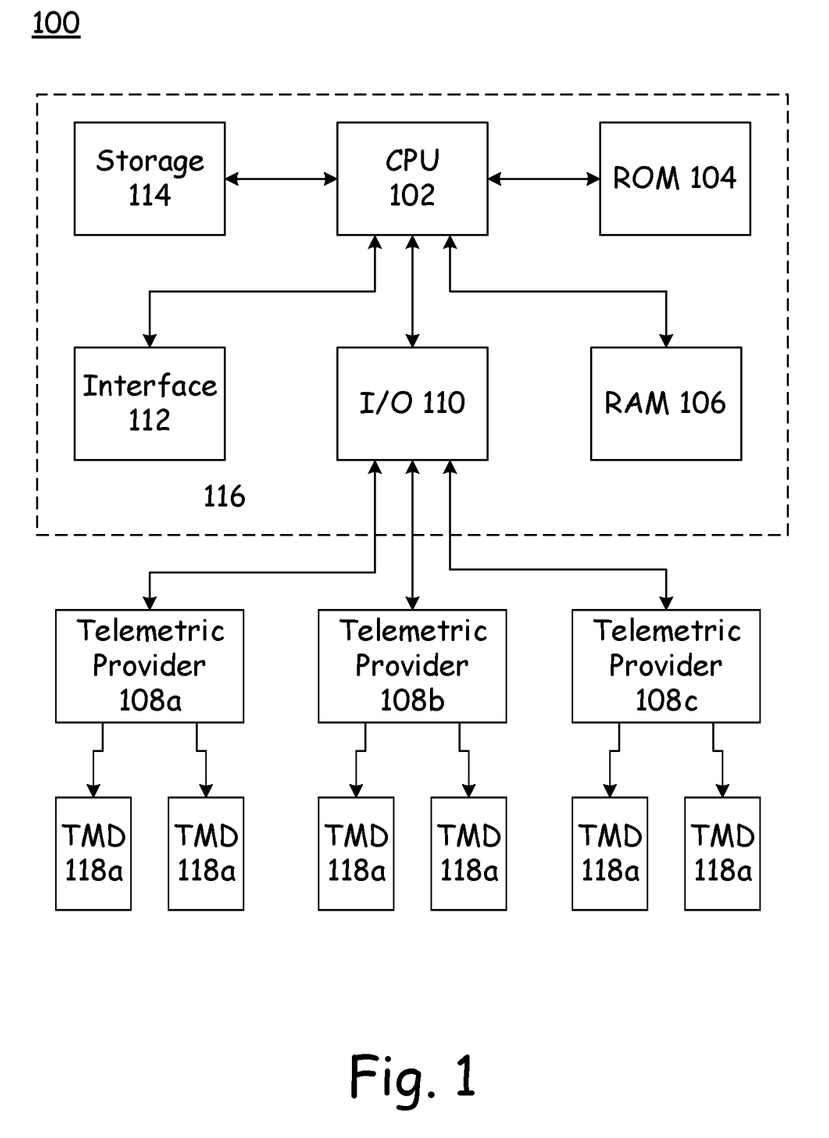
FIG. 1 depicts a system for communicating with telematics associated with different service providers, according to an embodiment of the present invention.

With reference now to FIG. 1, there are described hardware and software components comprising a system 100, including a master system 116, according to various embodiments of the present invention. The system 100 enables a user, such as a lender or a dealership, to receive information from all of the telematics in their portfolio—regardless of the service provider for a given telematic device 118—through a common interface. This is accomplished by using the master system 116 to communicate with all of the various telematic service providers 108 that might be represented in a user's telematic portfolio.

As depicted, the master system 116 includes a processor 102 that controls the various modules of the master system 116. As used herein, the term "module" comprehends both computer hardware and computer software, and blended embodiments of such. Modules are typically defined by the function that they provide, and as such, different modules might make common use of various software and hardware elements.

Also present in various embodiments of the master system 116 is a read only memory module 104 in which, for example, is disposed the programming for the operation of the master system 116, as described in more detail hereafter. A random access memory module 106 is provided to hold data and programming instructions that are currently in use by the processor 102.

A storage module 114 holds information such as a database of telematic devices in the user's portfolio, the service provider 108 with which those telematics 118 are associated, login information for the service providers 108, and so forth. Other information that is associated with the telematics 118 includes such things as the borrower's name, address, the vehicle year, make, and model, VIN, and the serial number of the telematic device 118 that is associated with both the buyer and the vehicle.

An input output module 110 allows the master system 116 to communicate with a variety of telematic service providers 108. As previously introduced, various telematic service providers 108 have access to different telematic devices 118.

For example, one provider 108 might cover a certain geographical area, another service provider 108 might cover telematic devices 118 of a certain type—such as newer devices, and so forth. Thus, there are various reasons why a given user might have a portfolio of telematic devices 118 that are serviced by different providers 108.

The communication between the I/O module 110 and the various telematic providers 108 can be accomplished in a variety of different ways. For example, the I/O module 110 in one embodiment is connected to the Internet, to which the various providers 108 are also connected. In other embodiments, the several connections between the I/O module 110 and the providers 108 include one or more proprietary connections.

An interface module 112 provides access for the user to the functions of the master system 116, and in some embodiments to the provider 108 and the telematics 118. In some embodiments, the master system 116 is implemented in a local desktop computer to which the user has access. In other embodiments, the interface module 112 is accessed remotely by the user, such that the master system 116 is disposed in one location, and the user accesses the interface module 112 from another location, such as across the Internet, for example. In some embodiments, the master system 116 is a multi-user system, that can be accessed and used simultaneously by a large number of remote users. In some embodiments, the user can access the interface module 112 from a handheld device, such as an Internet-connected phone.

Figure 2:
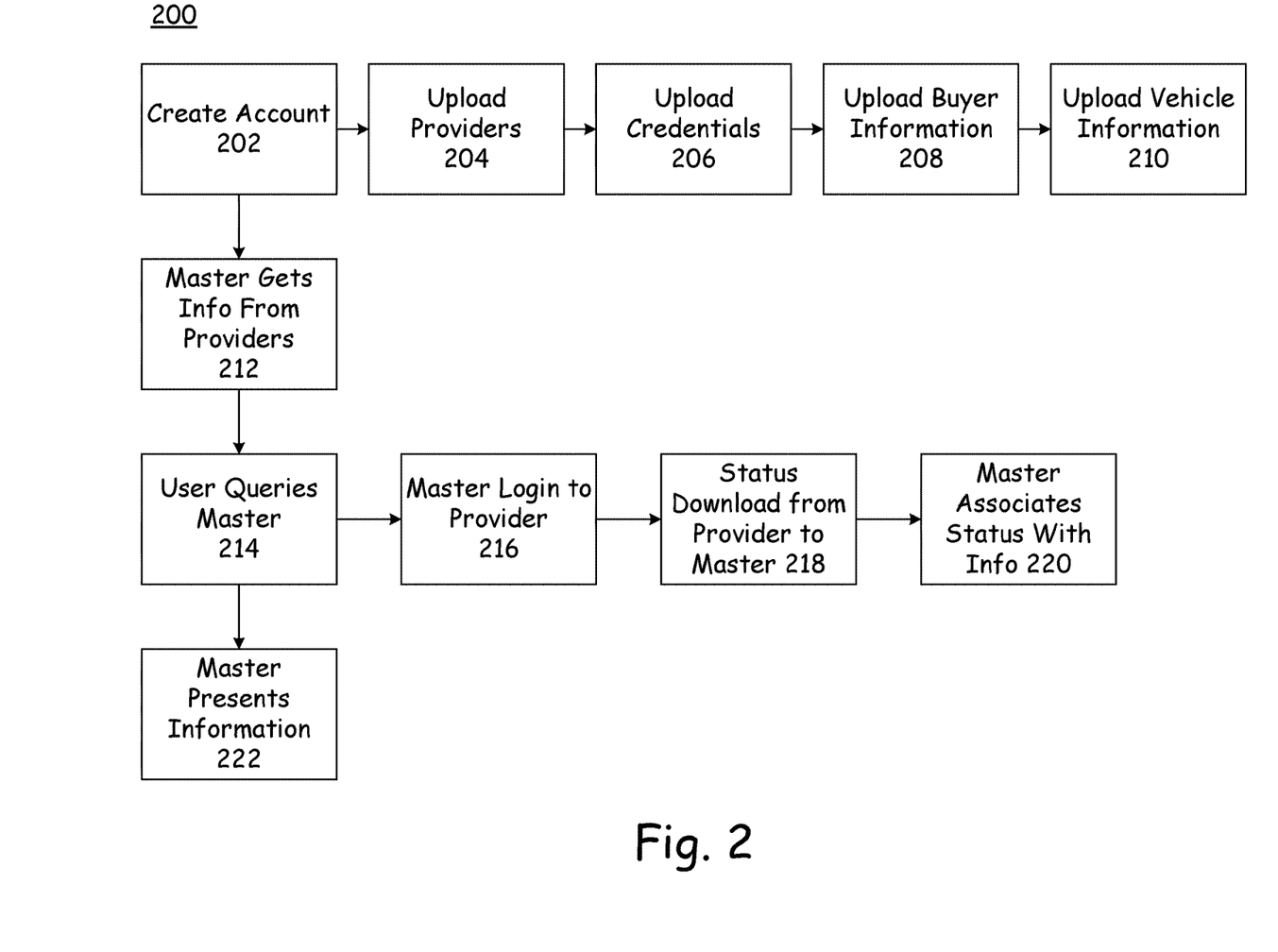
FIG. 2 depicts a method for communicating with telematics associated with different service providers, according to an embodiment of the present invention.

With reference now to FIG. 2, there is depicted a method 200 for using the system 100. This method assumes that the user already has existing accounts with one or more service provider 108, with which are associated one or more telematics 118.

As given in block 202, the user creates an account on the master system 116. As a part of this process, the user provides information in regard to the service providers 108 with which the user has accounts, as given in block 204. The user also provides to the master system 116 the user's login credentials for each of those service providers 108, as given in block 206.

In some embodiments, the user also provides to the master system 116 additional information, such as buyer information that is associated with each telematic device 118 in the user's portfolio, as given in block 208, and information in regard to the vehicle that is associated with each telematic device 118, as given in block 210. In other embodiments, information such as in regard to the buyers and the vehicles can be automatically gathered by the master system 116, such as from the various service providers 108, and does not need to be manually entered by the user into the master system 116.

The master system 116 stores all of this information in the storage module 114.

Once the information has been stored in the master system 116, the master system 116 uses the information to access the user's accounts on the various service providers' 108 systems, and in one embodiment, downloads additional information from the service providers 108 to associate with the user's account, and stores that information in the storage module 114, as given in block 212.

For example, as introduced above, the master system 116 can potentially retrieve information in regard to the various telematic devices 118 associated with the user's portfolio on each of the service provider's 108 system, buyer information, and vehicle information, as well as vehicle status information, such as location.

In some embodiments, this information from the various service providers 118 is automatically kept up to date at a regular interval by the master system 116, such as by the master system 116 logging into each service provider 108 on a regular basis—such as at an interval that is specified by the user—and retrieving all or a subset of the status information that is available on each service provider's 108 system.

At desired times, the user can log in to the master system 116 and present a status query to the master system 116, as given in block 214. The status query can take many different forms. For example, the user might want to see information on every vehicle that is associated with a given service provider 108. Alternately, the user might want to see information on every vehicle within a given geographical area. Similarly, the user might want to see information on any vehicle that has an alert associated with it, such as if the vehicle buyer has done something that violates an agreement between the user and the buyer. Many other such queries are contemplated herein.

The queries might be able to be answered locally within the master system 116. Alternately, the master system 116 might need to access one or more of the service providers 108 in order to answer the query.

Once a query has been entered to the master system 116, the master system 116 uses the stored user credentials to log in to one or more of the service provider 108 systems, as necessary, as given in block 216. After the master system 116 has gained access to the desired selection of service provider 108 systems, the master system 116 downloads all or a desired subset of status information from the service provider 108 system, as given in block 218. This information is associated with the other information in the storage module 114 in regard to the user's portfolio of buyers, vehicles, and telematic devices 118, as given in block 220.

Once the various associations have been made by the master system 116, the information in regard to the user's query is presented to the user through the interface 112, as given in block 222.

In this manner, the user can remain engaged with one interface—that which is presented to him from the master system 116—regardless of the various service provider 108 systems from which the desired information must be retrieved. All of the work in remembering which service provider 108 system must be accessed, the credentials to access that service provider's 108 system, and navigating the menus of that service provider's 108 system are handled in the background by the master system 116, allowing the user to focus on the relevant information instead of the process by which that information is retrieved.

Further, all of the user's desired information can be presented at one time, instead of the user only seeing a subset of his desired information, such as might be given by a single service provider 108 at a time. This helps the user to more easily see data trends in a way that would be more difficult to see without merging the unified data set as provided by the master system 116.

Figure 3:
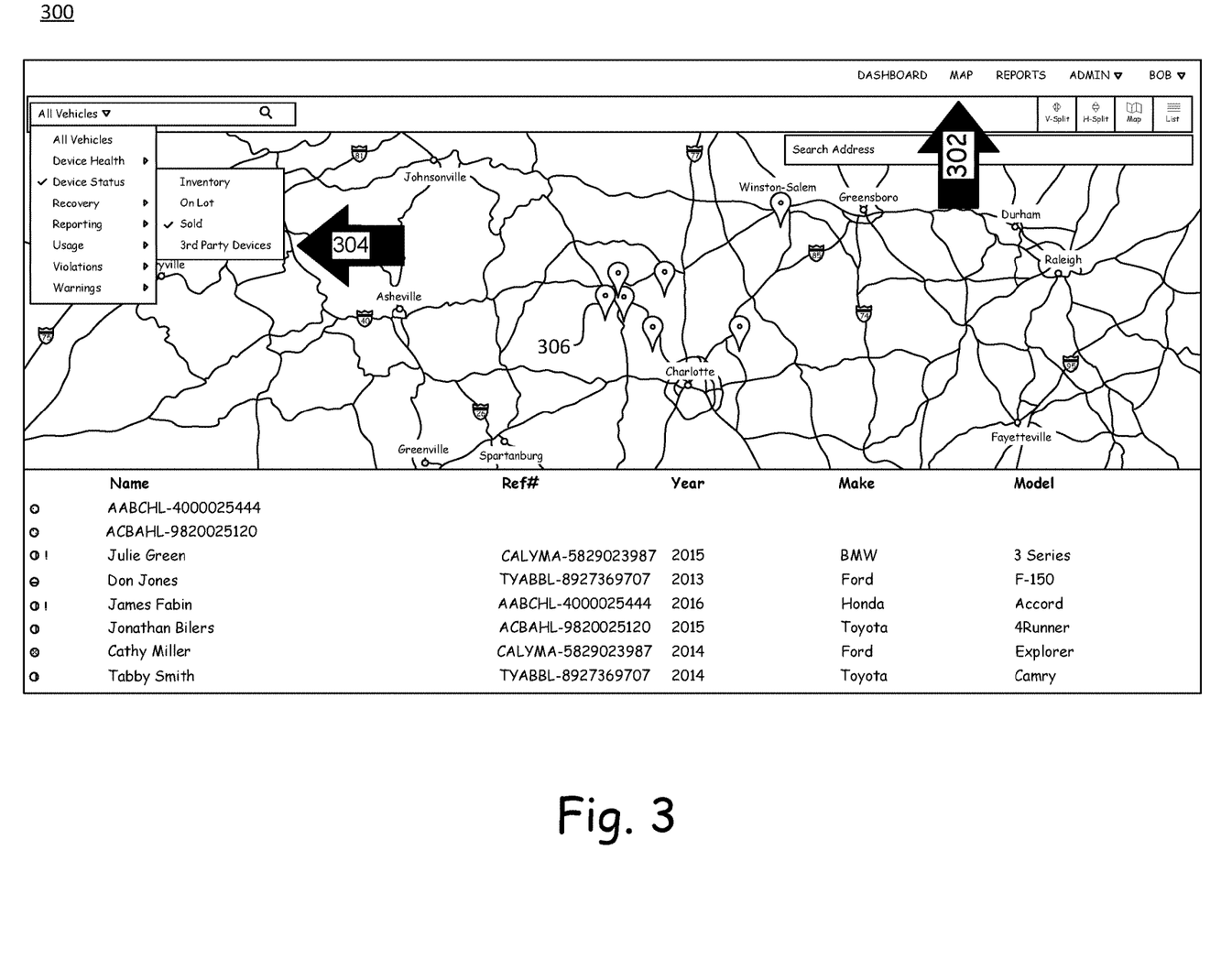
FIG. 3 depicts a master system with an option for accessing telematics information from a variety of different service providers, according to an embodiment of the present invention.

With reference now to FIG. 3, there is depicted a view 300 as presented in one embodiment of the master system 116. In this view, the user has selected a map view 302 of the telematic data. Further, the user has selected from the menus 304 the device status of all sold vehicles. Other views 302 and selections 304 are comprehended herein. After specifying the desired view 302 and selection 304, the location of those telematics associated with the specified criteria are depicted on the map as indicators 306. This information can be updated at user-selected intervals, or displayed as of one given point in time, or live. In some embodiments, the indicators 306 can be displayed in a historical context of where the telematic 118—and, presumably, the vehicle associated with the telematic 118—has been over a given prior length of time.

Figure 4:
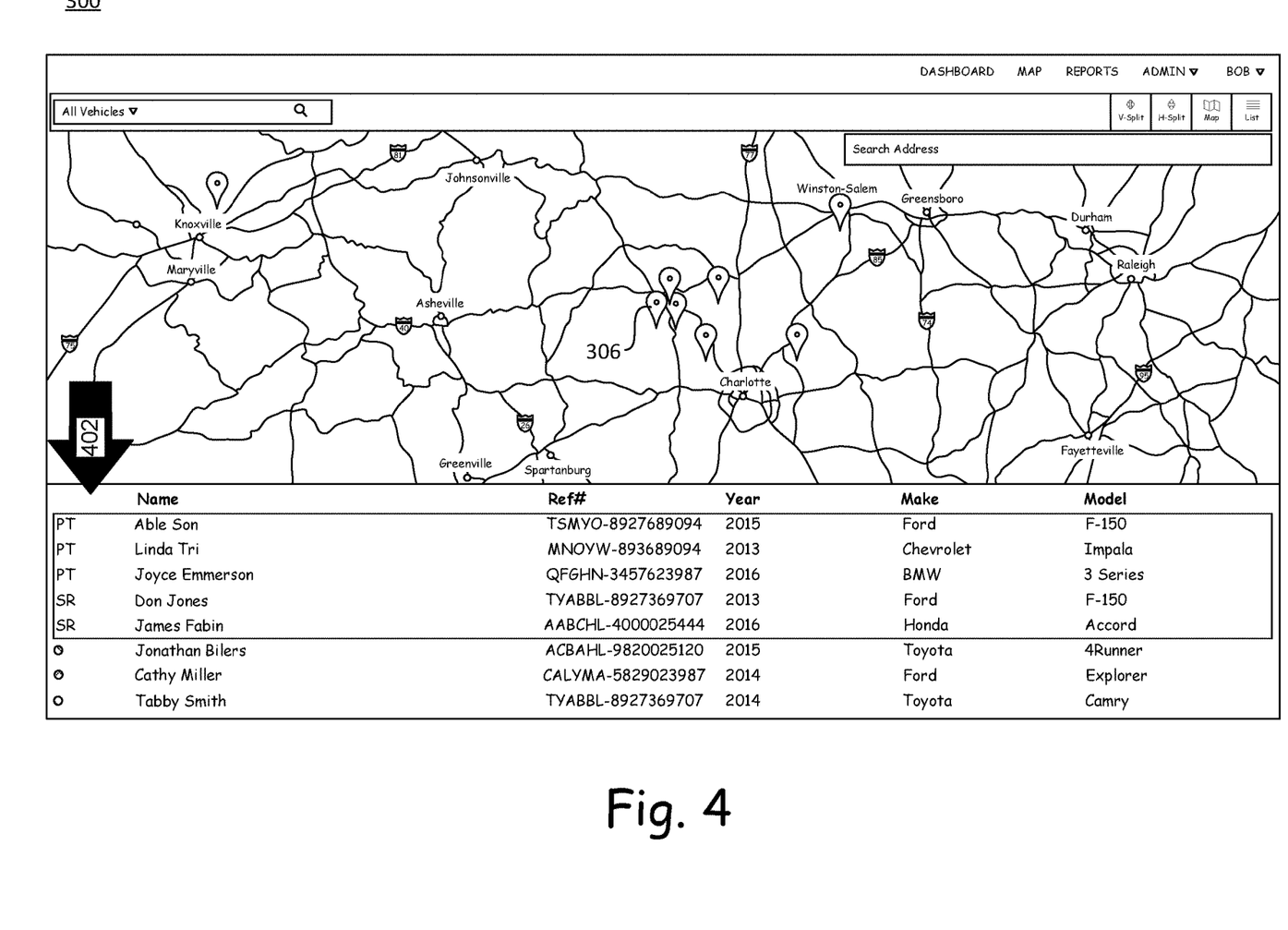
FIG. 4 depicts a results page of a master system when accessing telematics information from a variety of different service providers, according to an embodiment of the present invention.

With reference now to FIG. 4, it can be seen that additional information 402 is depicted in regard to each of the telematics 118 displayed on the map view. This information is taken from one or both of the associated service providers 108 and the storage module 114, which data has previously been associated with the given telematic 118. In this embodiment, the information is provided as a table. However, in other embodiments the information could be presented as pop-up text, such as when the user mouses over a given one off the indicators 306.

Figure 5:
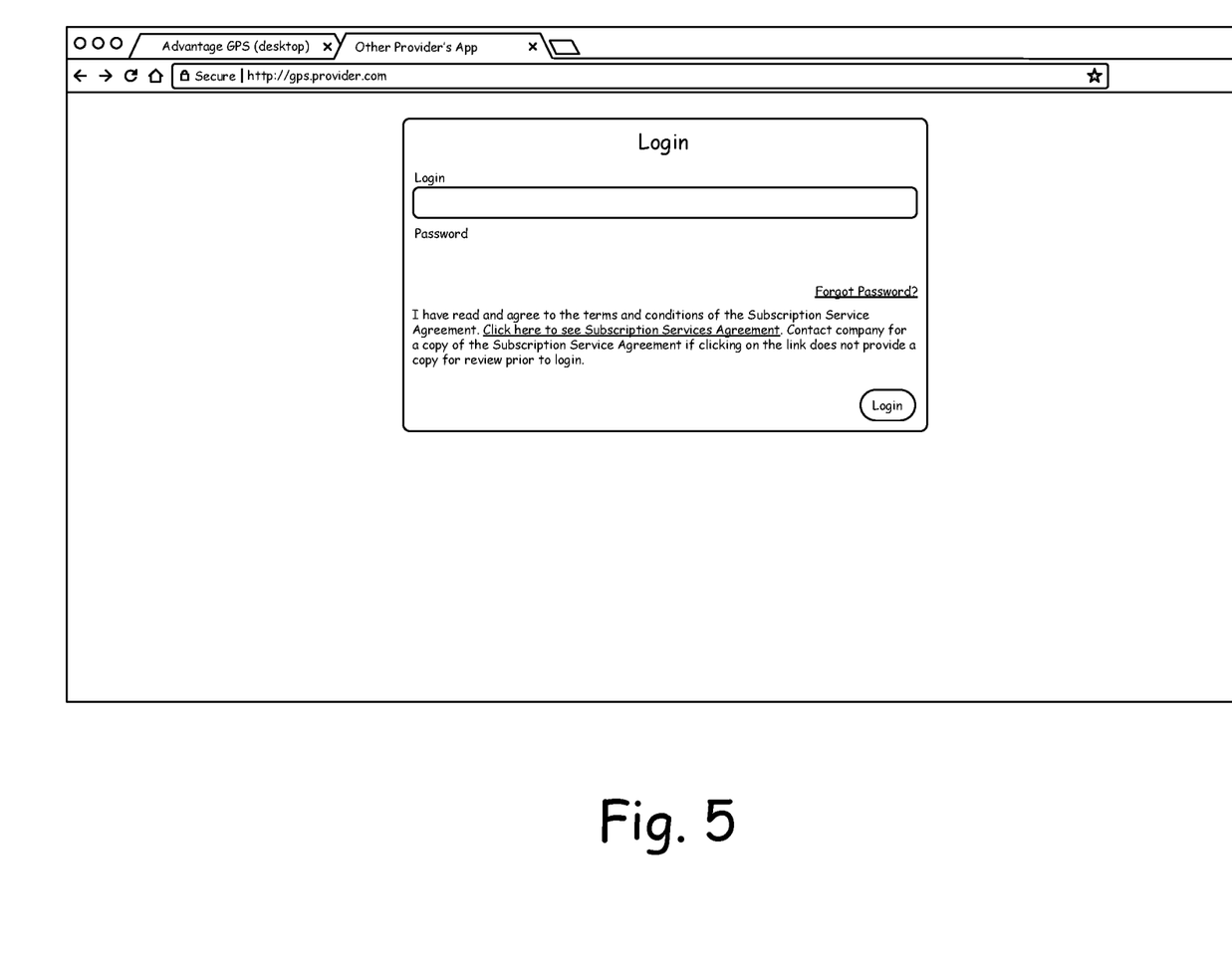
FIG. 5 depicts a login screen that is presented by a master system when accessing a telematics service provider, according to an embodiment of the present invention.

With reference now to FIG. 5, there is depicted a login screen that the master system 116 presents to the user for the purpose of logging in to a service provider 108, such as in an embodiment when the master system 116 does not automatically log in to the service providers 108. In another embodiment, a login screen such as that depicted is used to log in to the master system 116, which thereby allows the user access to all of his service providers 108.

In some embodiments, the master system 116 uses what is designated herein as a high-level language. The high-level language is used between the user and the master system 116, for issuing commands from the user to the master system 116 and presenting data from the master system 116 to the user. However, commands from the master system 116 to the service providers 108, and data from the service providers 108 to the master system 116, are sent and received according to the provider-specific language for each service provider 108, which provider-specific languages are generally designated herein as low-level languages. Thus, the master system 116 converts commands from the high-level language to a low-level language, and converts data from a low-level language to the high-level language, automatically and without any intervention from the user.

Thus, one benefit of the master system 116 is that it allows the user to communicate using just one language—the high-level language, and the master system 116 takes care of converting commands to and data from the different low-level languages used by the service providers 108. As used herein, the term "language" is not a reference to various protocols, such as Ethernet, Wi-Fi, or Zigbee, the use of any such at various points in the communication process is contemplated herein.

Further, in some embodiments the master system 116 takes data that is returned from the various service providers 108, and creates an entirely new presentation of the unified data, such as by creating a new web page that is formulated from data received from several different providers 108, and is presented in an entirely new way.

The master system 116 automatically identifies the appropriate IP address and login credentials for the needed service providers 108, and presents the information requested back to the user, without forcing the user to log in to other applications. In some embodiments, the master system 116 uses basic traffic filtering capabilities with access control lists. The access lists are configured for all routed network protocols (IP, AppleTalk, and so on) to filter the packets of those protocols as the packets pass through a router. Designation addresses of the traffic are used to allow access to the applications of other service providers 108, if the user is logged into those other application. If the user is not logged in, then the login page of the other service provider 108 will be displayed, as mentioned above.

In one embodiment, the master system 116 uses access lists for outbound and inbound traffic protocols, per router interface. This enables the master system 116 to populate its data presentation screens with data from other providers 108.

In some embodiments the user can get a report of device 118 health, such as whether the device 118 is still reporting regularly, or a summary per supplier of overall health of those devices 118. In other embodiments, a report is given of device 118 aging, such as how many months of service have passed since the activation of each device 118. Another report provides a comparative analysis of device 118 health across providers 108. Some embodiments provide general analytics tools that allow users to build custom analytical routines.

The master system 116 also provides, in some embodiments, stolen vehicle recovery services, consumer tracking services, and business to business analytics services.

The foregoing description of embodiments for this invention has been presented for purposes of illustration and description. It is not intended to be exhaustive or to limit the invention to the precise form disclosed. Obvious modifications or variations are possible in light of the above teachings. The embodiments are chosen and described in an effort to provide illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

The invention claimed is:

1. A master system for providing a single interface between a user and multiple vehicle tracking service providers that provide vehicle tracking services for multiple telematic devices associated with the user, the master system comprising:
   a storage module for storing information, the information including serial numbers of the telematic devices, vehicle information associated with the telematic devices, location information associated with the telematic devices, and information associating each of the telematic devices with a corresponding one of the vehicle tracking service providers;
   an interface for receiving queries from the user and providing selected subsets of the information as responses to the user,
   an input-output having multiple concurrent communication sessions with the multiple vehicle tracking service providers, and
   a processor for,
      receiving the queries from the user through the interface,
      analyzing the information on the storage module to identify one or more of the vehicle tracking service providers to which the queries pertain,
      requesting data from the one or more identified vehicle tracking service providers through the input-output,
      receiving feedback from the one or more identified vehicle tracking service providers through the input-output, and
      associating the feedback with relevant portions of the information, and presenting at least portions of the feedback with the relevant portions of the information to the user through the interface as the response to the user's query.

2. The master system of claim 1, wherein the master system receives queries from the user in a high-level language, produces commands in a low-level language based on the queries, and sends the commands to the vehicle tracking service providers.

3. The master system of claim 1, wherein the master system receives feedback from the vehicle tracking service providers in a low-level language, produces responses in a high-level language, and sends the responses to the user.

4. The master system of claim 1, wherein the master system receives feedback from the vehicle tracking service providers in a low-level language, produces responses as new web pages, and sends the new web pages to the user.

5. The master system of claim 1, wherein the master system provides the response to the user as a map that depicts an associated location for each telematic device associated with a given one of the queries.

6. The master system of claim 1, wherein the master system provides the response to the user as an interactive map that depicts indictors on associated locations for each telematic device associated with a given one of the queries, and when the user selects one of the indicators, the master system displays additional information associated with the telematic device.

7. A method for providing a single interface between a user and multiple vehicle tracking service providers that provide vehicle tracking services for multiple telematic devices associated with the user, the method comprising the steps of:
   storing information in a storage module, the information including serial numbers of the telematic devices, vehicle information associated with the telematic devices, location information associated with the telematic devices, and information associating each of the telematic devices with a corresponding one of the vehicle tracking service providers,
   receiving queries from the user and providing selected subsets of the information as responses to the user through an interface,
   holding multiple concurrent communication sessions with the multiple vehicle tracking service providers through an input-output,
   receiving the queries from the user through the interface,
   analyzing the information on the storage module to identify one or more of the vehicle tracking service providers to which the queries pertain,
   requesting data from the one or more identified vehicle tracking service providers through the input-output,
   receiving feedback from one or more identified vehicle tracking service providers through the input-output,
   associating the feedback with relevant portions of the information, and
   presenting at least portions of the feedback with the relevant portions of the information to the user through the interface as the response to the user's query.

8. The method of claim 7, wherein the queries are received from the user in a high-level language, are converted to a low-level language, and sent to the vehicle tracking service providers in the low-level language.

9. The method of claim 7, wherein the feedback is received from the vehicle tracking service providers in a low-level language, converted to a high-level language, and the response is sent to the user in the high-level language.

10. The method of claim 7, wherein the feedback from the vehicle tracking service providers is received in a low-level language, converted to a new web page, and the new web page is sent to the user.

11. The method of claim 7, wherein the response to the user is formatted as a map that depicts an associated location for each telematic device associated with a given one of the queries.

12. The method of claim 7, wherein the response to the user is formatted as an interactive map that depicts indictors on associated locations for each telematic device associated with a given one of the queries, and when the user selects one of the indicators, additional information associated with the telematic device is displayed on the map.

13. The method of claim 1 wherein the vehicle information includes buyer information.

14. The method of claim 7 wherein the vehicle information includes buyer information.

\* \* \* \* \*